UNITED STATES PATENT OFFICE.

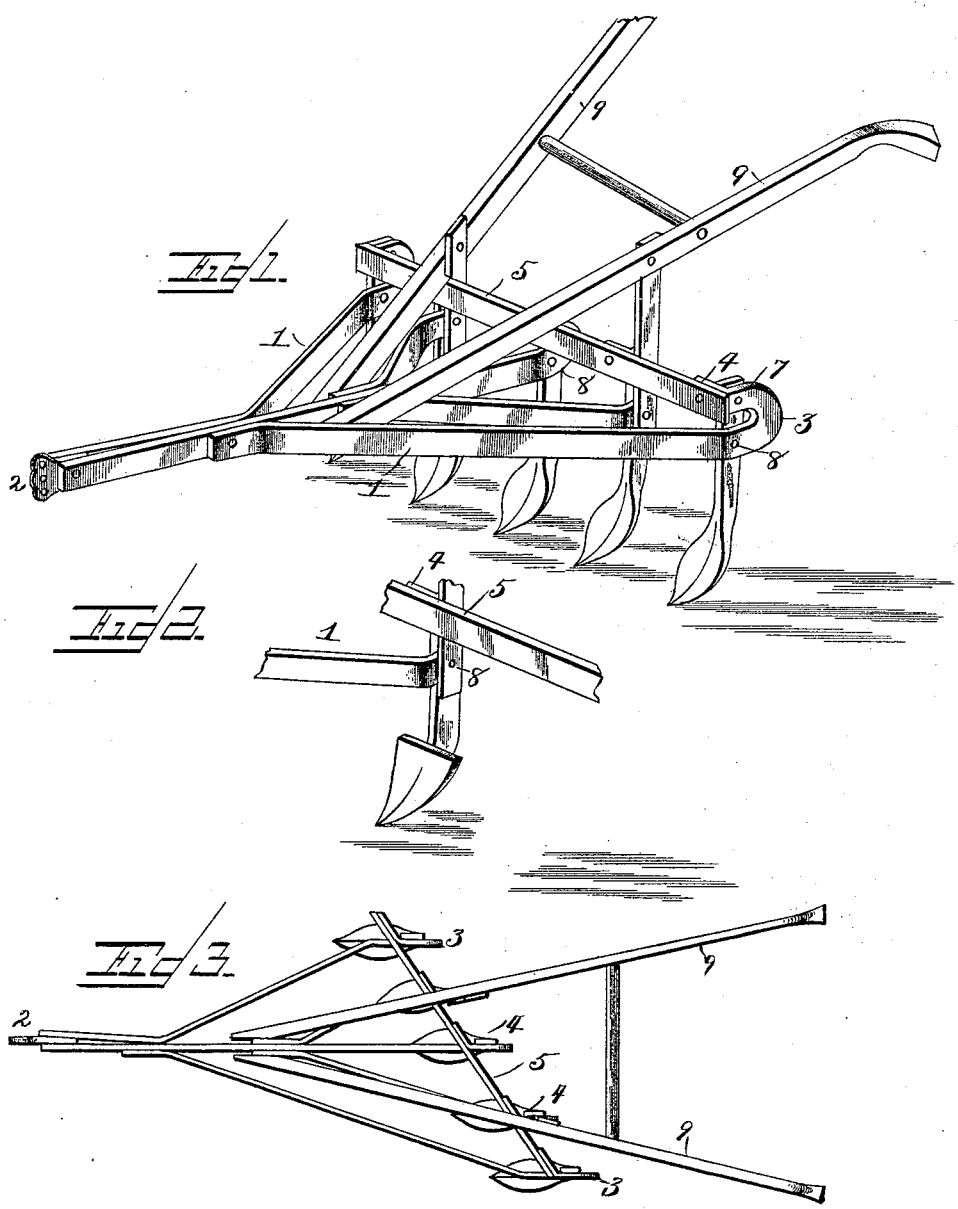

THOMAS J. CROFT, OF ELLISVILLE, MISSISSIPPI.

SIDE HARROW AND CULTIVATOR.

SPECIFICATION forming part of Letters Patent No. 480,174, dated August 2, 1892.

Application filed March 5, 1892. Serial No. 423,884. (No model.)

*To all whom it may concern:*

Be it known that I, THOMAS J. CROFT, a citizen of the United States, and a resident of Ellisville, in the county of Jones and State of Mississippi, have invented certain new and useful Improvements in Side Harrows and Cultivators; and I do hereby declare that the following is a full, clear, and exact description of the invention, which will enable others skilled in the art to which it appertains to make and use the same, reference being had to the accompanying drawings, which form a part of this specification.

My invention relates to improvements in side harrows and cultivators of that class in which the teeth are arranged in a line diagonal to the line of draft.

The object of the invention is to provide an improved construction of the same, whereby the parts are more rigidly connected together and the implement thus rendered stronger and more durable.

The invention consists in the novel construction and combination of parts hereinafter fully described and claimed.

In the accompanying drawings, Figure 1 is a perspective view of a harrow constructed according to my invention. Fig. 2 is a detail view showing one of the standards provided with a cultivator-shovel, and Fig. 3 is a plan view of the same.

In the said drawings, the reference-numeral 1 designates a series of reach-bars, to which the teeth-standards are bolted. As shown, there are five of these bars, the center one of which consists of a straight longitudinal bar, to which the other bars are bolted intermediate of its ends, except one of the outer bars, which is extended to the forward end of said center bar. Between these two ends is clamped a clevis 2, with which a whiffletree may be connected. All of these bars are arranged edgewise, so as to give them greater rigidity and prevent breaking or bending, and at their rear ends are bent or formed into a curve 3 and an angular arm 4. The arms 4 are bolted to a diagonal bar 5, while the teeth-standards 6 are bolted to the curved portions at 7 and 8. It will thus be seen that the standards have two points of connection with the reach-bars, whereby they are more rigidly connected therewith.

The numeral 9 denotes the handles, secured to the center and intermediate reach-bars, and intermediate their ends they are provided with downwardly-depending arms 10, secured to the curved portions of the two intermediate reach-bars.

In Fig. 2 I have shown the device constructed for use as a cultivator. In this the two teeth-standards of the intermediate reach-bars are removed and the standards of the center and outer reach-bars are provided with cultivator-shovels instead of harrow-teeth.

From the above it will be seen that I provide a simple, inexpensive, and very efficient implement, which may be used either as a harrow or a cultivator and which will perform its work in a very efficient manner.

Having thus described my invention, what I claim is—

A harrow or cultivator comprising a series of edgewise reach-bars connected together at their forward ends and at their rear ends formed with a curve and angular arm, the diagonal bar bolted to said arms, the standards bolted to said curved portions, the handles, and the depending arms, substantially as described.

In testimony that I claim the foregoing as my own I have hereunto affixed my signature in presence of two witnesses.

THOMAS J. CROFT.

Witnesses:
E. M. DEVALL,
JNO. H. BYNUM.